United States Patent
Besore

(10) Patent No.: US 8,504,216 B2
(45) Date of Patent: Aug. 6, 2013

(54) DSM ENABLING OF ELECTRO MECHANICALLY CONTROLLED REFRIGERATION SYSTEMS

(75) Inventor: John K. Besore, Prospect, KY (US)

(73) Assignee: General Electric Company, Schenectady, NY (US)

(*) Notice: Subject to any disclaimer, the term of this patent is extended or adjusted under 35 U.S.C. 154(b) by 80 days.

(21) Appl. No.: 12/951,387

(22) Filed: Nov. 22, 2010

(65) Prior Publication Data

US 2012/0130559 A1    May 24, 2012

(51) Int. Cl.
| | |
|---|---|
| G05D 3/12 | (2006.01) |
| G06G 7/66 | (2006.01) |
| G05B 21/00 | (2006.01) |
| F25D 13/04 | (2006.01) |
| F25B 49/00 | (2006.01) |
| G01D 18/00 | (2006.01) |
| H01H 3/00 | (2006.01) |

(52) U.S. Cl.
USPC ........... 700/295; 700/205; 700/275; 700/291; 62/65; 62/132; 702/85; 702/99; 335/189

(58) Field of Classification Search
USPC ................. 700/2, 9, 12, 19, 22, 68, 205, 275, 700/286, 295; 62/65, 132, 156, 159, 168; 702/85, 99, 130; 335/189
See application file for complete search history.

(56) References Cited

U.S. PATENT DOCUMENTS

| | | | |
|---|---|---|---|
| 2,322,714 A | 6/1943 | Kalischer | |
| 2,333,263 A | 11/1943 | McCabe | |
| 3,367,351 A | 2/1968 | Smyers, Jr. | |
| 3,408,506 A | 10/1968 | Bergsma | |
| 3,656,078 A | 4/1972 | Domenico | |
| 4,144,930 A * | 3/1979 | Ferdelman | 165/238 |
| 5,320,162 A * | 6/1994 | Seaman | 165/255 |
| 5,533,360 A | 7/1996 | Szynal et al. | |
| 5,816,060 A | 10/1998 | Brownell et al. | |
| 6,631,622 B1 | 10/2003 | Ghent et al. | |
| 6,694,753 B1 | 2/2004 | Lanz et al. | |
| 7,010,363 B2 | 3/2006 | Donnelly et al. | |
| 7,130,719 B2 | 10/2006 | Ehlers et al. | |
| 7,949,615 B2 | 5/2011 | Ehlers et al. | |
| 7,994,455 B2 * | 8/2011 | Song et al. | 219/494 |
| 2003/0177776 A1 | 9/2003 | Ghent et al. | |
| 2006/0036350 A1 | 2/2006 | Bohrer et al. | |
| 2006/0190140 A1 | 8/2006 | Soni | |
| 2009/0082885 A1 * | 3/2009 | Nass | 700/90 |
| 2009/0095726 A1 | 4/2009 | Song et al. | |
| 2009/0160599 A1 * | 6/2009 | Tateishi | 337/360 |
| 2009/0216386 A1 * | 8/2009 | Wedel | 700/295 |
| 2010/0070099 A1 | 3/2010 | Watson et al. | |

(Continued)

Primary Examiner — Kavita Padmanabhan
Assistant Examiner — Darrin Dunn
(74) Attorney, Agent, or Firm — Global Patent Operation

(57) ABSTRACT

A system for reducing the peak power consumption by a refrigeration system is provided. The system comprises a first electromechanical cold control calibrated to a first temperature setpoint, a second electromechanical cold control calibrated to a second temperature setpoint, said first and second cold controls each having a setpoint selector member operatively linked such that adjustment of one results in a corresponding adjustment of the other, a DSM module responsive to demand state signals from an associated utility indicative of at least a peak demand and an off peak demand state, and a DSM switching device responsive to the DSM module and operative to selectively render one or the other of the cold controls effectively operative to control the cooling system depending upon the demand state signal.

12 Claims, 8 Drawing Sheets

SYSTEM DIAGRAM

U.S. PATENT DOCUMENTS

| | | |
|---|---|---|
| 2010/0101254 A1 | 4/2010 | Besore et al. |
| 2010/0121499 A1* | 5/2010 | Besore et al. ............... 700/295 |
| 2010/0179670 A1 | 7/2010 | Forbes et al. |
| 2010/0179708 A1* | 7/2010 | Watson et al. ............... 700/296 |
| 2010/0187219 A1* | 7/2010 | Besore et al. ............... 219/494 |
| 2010/0206869 A1 | 8/2010 | Nelson et al. |
| 2010/0207728 A1* | 8/2010 | Roscoe et al. ............... 340/10.1 |
| 2011/0011100 A1* | 1/2011 | Sundhar ............... 62/3.6 |
| 2011/0175742 A1 | 7/2011 | Shin et al. |
| 2011/0190958 A1* | 8/2011 | Hirst ............... 700/295 |
| 2012/0006525 A1 | 1/2012 | Lafleur et al. |
| 2012/0023987 A1 | 2/2012 | Besore et al. |
| 2012/0055179 A1 | 3/2012 | Junge et al. |

\* cited by examiner

DSM ENABLING OF ELECTRO MECHANICALLY CONTROLLED REFRIGERATION SYSTEMS

BACKGROUND OF THE DISCLOSURE

This disclosure relates to energy management, and more particularly to energy management of household refrigeration appliances. The disclosure finds particular application to adapting electromechanically controlled refrigerators for operation in home energy management systems.

Many utilities are currently experiencing a shortage of electric generating capacity due to increasing consumer demand for electricity. Currently utilities charge a flat rate, but with increasing cost of fuel prices and high energy usage at certain parts of the day, utilities have to buy more energy to supply customers during peak demand, which causes prices to rise during these times. If peak demand can be lowered, then a potential huge cost savings can be achieved and the peak load that the utility has to accommodate is lessened. In order to reduce high peak power demand, many utilities have instituted time of use (TOU) metering and rates which include higher rates for energy usage during on-peak times and lower rates for energy usage during off-peak times. As a result, consumers are provided with an incentive to use electricity at off-peak times rather than on-peak times and to reduce overall energy consumption of devices at all times.

To take advantage of the lower cost of electricity during off-peak times, systems have been provided that can automatically operate power consuming devices during off-peak hours in order to reduce consumer's electric bills and also to reduce the load on generating plants during on-peak hours. Active and real time communication of energy costs of devices to the consumer enables informed choices of operating the power consuming functions of the devices. Although these systems are capable of being run automatically according to demand period, a user may choose to override the system and run a device normally, or delay the operation of the system for a particular period of time.

One method for providing low-cost reduction of peak and average power is to implement a simple demand side management "DSM" control device, also known as a smart appliance module "SAM", in an existing electromechanical appliance that will adjust, or disable power consuming elements to reduce maximum power consumption. However, such a DSM/SAM add-on device will generally cut off the power to an entire appliance. Therefore, there exists a need for reducing peak power consumption without extinguishing all power to the appliance.

Electronically controlled refrigerators generally include a microcomputer that has control over various functions of the appliance, such as temperature set point for example, to which can be programmed to provide an appropriate DSM/SAM response. For example, when a utility transmits a signal corresponding to a peak demand period, the microcomputer may block access to, or temporarily shuts off, particular features, such as the quick chill, quick thaw, or quick cool features that have associated fans that require additional energy. In addition, or alternatively, the microcomputer may adjust the temperature set point of the freezer, allowing the freezer compartment temperature to increase slightly until the peak demand period is over. At the conclusion of the high rate period, the microcontroller resets the set point to the original set point temperature. The microcontroller may additionally delay a scheduled defrost if the defrost is set to occur during a peak demand period.

While electronically controlled refrigerators can adjust energy usage in response to a "high demand", many refrigerators include less technically sophisticated controls that do not use a microprocessor.

The subject application provides a system that enables refrigerators that are not equipped with electronic controls to effectively adjust energy usage in response to "high demand" conditions.

SUMMARY OF THE DISCLOSURE

According to one aspect of the present disclosure, a system for reducing the peak power consumption by a refrigeration system is provided. The system comprises a first electromechanical cold control calibrated to a first temperature setpoint, a second electromechanical cold control calibrated to a second temperature setpoint, said first and second cold controls each having a setpoint selector member operatively linked such that adjustment of one results in a corresponding adjustment of the other, a DSM module responsive to demand state signals from an associated utility indicative of at least a peak demand and an off peak demand state, and a DSM switching device responsive to the DSM module and operative to selectively render one or the other of the cold controls effectively operative to control the cooling system depending upon the demand state signal.

According to another aspect of the present disclosure, a method for reducing peak power consumption in an electromechanically controlled refrigerator having at least one compartment is provided. The method includes mechanically linking a first cold control having a first adjustable switch to a second cold control having a second adjustable switch, calibrating the first cold control to a first temperature set point and the second cold control to a second temperature set point that is higher than the first temperature set point, and opening and closing a DSM switching device in response to a signal received from an associated DSM module indicative of at least a peak demand and an off peak demand state of an associated utility. Opening the DSM switching device shifts control from the first cold control to the second cold control, causing the temperature to be controlled to a higher setpoint temperature.

According to yet another aspect of the present disclosure, a system for reducing the power consumption in an electromechanically controlled refrigerator during periods of peak power demand, including at least a freezer compartment and a fresh food compartment is provided. The system comprises a cold control device being calibrated to a temperature set point, a bourdon tube having a first end operatively connected to the cold control, and a second end, opposite the first end, located in one of the freezer and the fresh food compartment, a heat source operative to supply a metered amount of heat to the bourdon tube, and a DSM switching device operatively controlled by an associated DSM module. The DSM module is configured to receive a signal indicative of at least one of a peak or non-peak demand period of an associated utility.

Still other features and benefits of the present disclosure will become apparent from reading and understanding the following detailed description.

BRIEF DESCRIPTION OF THE DRAWINGS

FIG. 3(*b*) illustrates an exemplary wiring diagram for the dual cold control of FIG. 3(*a*);

FIG. 7(*b*) illustrates a schematic of DSM module defrost cycle control in accordance with yet another aspect of the present disclosure.

DETAILED DESCRIPTION OF THE PREFERRED EMBODIMENTS

Figure 1:
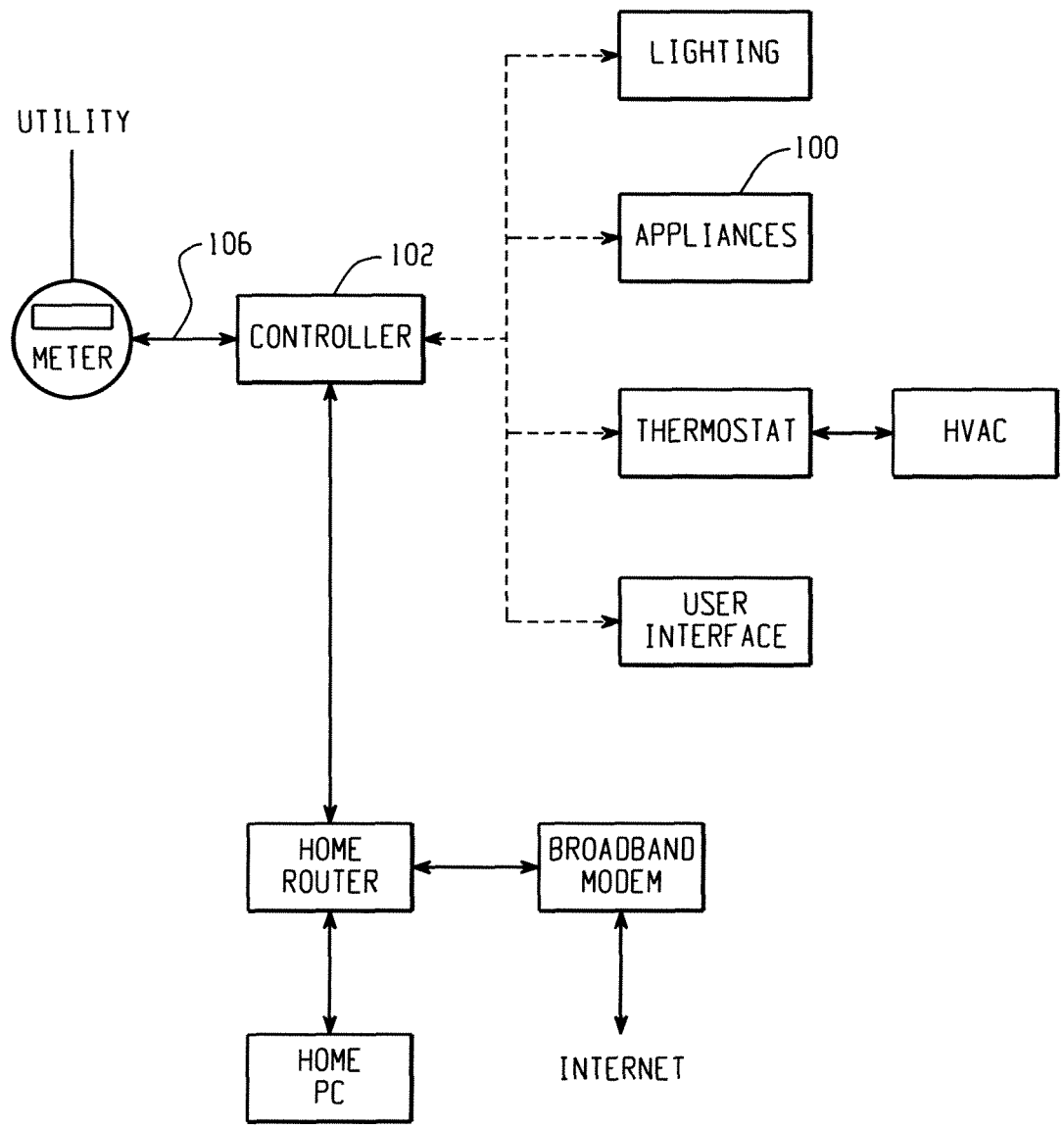
FIG. 1 illustrates an exemplary embodiment of an energy management system for household appliances.
Figure 2:
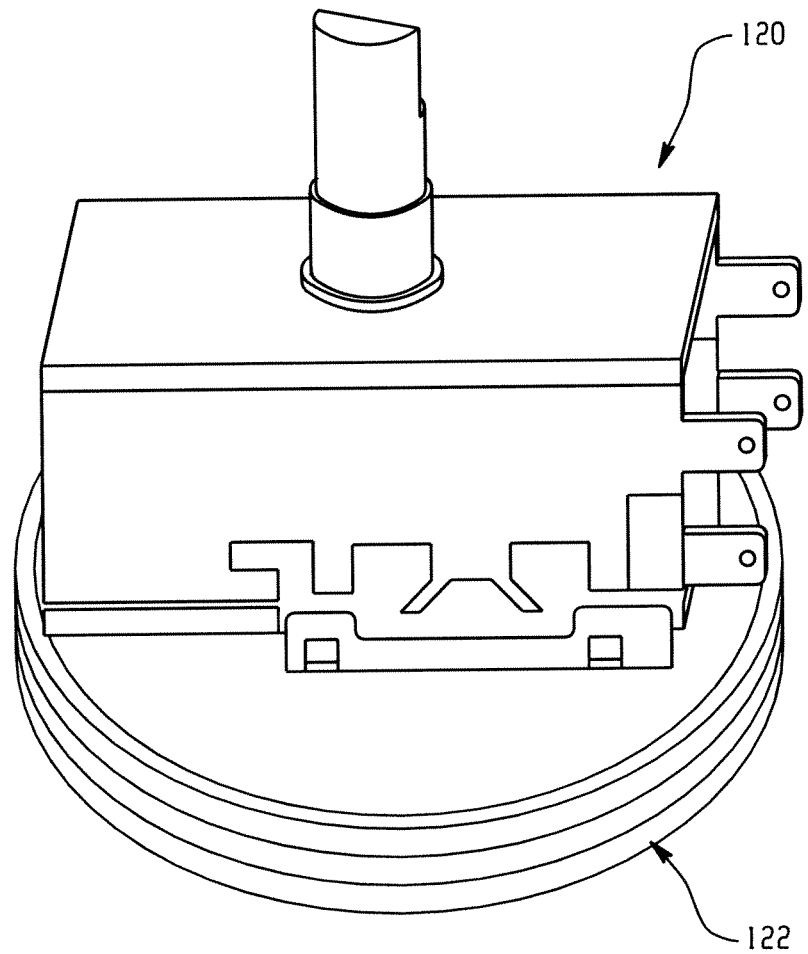
FIG. 2 illustrates an exemplary prior art cold control device.

An exemplary embodiment of an energy management system for household appliances 100 is illustrated in FIG. 1. An electronic controller 102 is provided for communicating with a utility meter and reducing power consumption in response to a signal 106 indicative of a peak demand period. Electromechanically controlled refrigerators, according to one aspect of the present disclosure, include a cold control 120 to control the temperature of the refrigerator compartments, which is depicted in FIG. 2. A cold control 120 is a temperature control incorporating a single pole, single throw switch with an associated set of electrical contacts for turning a refrigerator's compressor and fans concurrently on and off. A bourdon tube 122 is associated with the cold control 120 to sense temperature increases and decreases in a refrigerator compartment. As introduced above, a bourdon tube 122 is a hollow tube filled with refrigerant or an inert gas and placed in the airstream of the compartment to be controlled. One end of the tube connects into the back of the cold control 120 and includes a diaphragm seal. The diaphragm seal is intimately associated with the counter spring located on one side and a pressurized gas on the other side of that seal. The other end of the bourdon tube 122 is positioned in the compartment of the refrigerator to be controlled that is indicative of the ambient temperature of the compartment.

For example, under normal conditions, it is desirable to maintain the temperature of the freezer in a domestic refrigeration appliance at 0° F., plus or minus a few degrees. Therefore, the cold control for the freezer would be calibrated such that the center setpoint position of the selector would provide a freezer compartment at 0 degrees F. If the user selects the 0 degree F. set point, the cold control would cycle the compressor to maintain the temperature in the freezer at approximately 0 degrees F. The bourdon tube located in an area of the freezer senses the temperature in its vicinity and if the temperature rises 1° or 1.5°, the pressure in the bourdon tube also rises, which causes the bourdon tube to expand and overcome the counter spring located on the other side of the diaphragm seal. By overcoming the counter spring, a contact is tripped to activate the compressor. The compressor will remain activated until the temperature in the freezer returns to the selected set point of 0° F., or other set point as the user may select. In accordance with the decreasing compartment temperature, the pressure in the bourdon tube also decreases and causes the counter spring to overcome the bourdon tube pressure acting on the diaphragm and open the contacts to deactivate the refrigeration system.

The cold control 120 includes an input selector, typically a rotatable shaft with a knob, for manually selecting the temperature set point. Adjusting the angular position of the shaft in one direction or the other alters the spring loading on the diaphragm seal, which follows to alter the selected setpoint temperature. Typically, the control is calibrated such that when the knob is at its center point, the set point temperature is the temperature at the midpoint of the selectable setpoint range, which for a freezer cold control is approximately 0° F. As the knob is rotated, the selected setpoint temperature is shifted up or down relative to the calibration point within established limits.

Figure 3A:
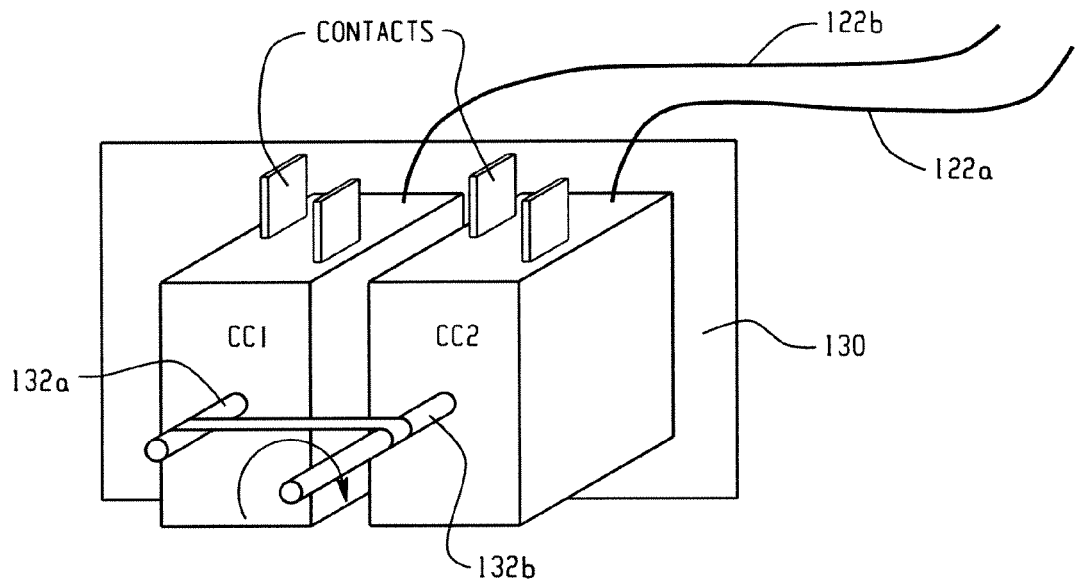
FIG. 3(*a*) illustrates a refrigerator temperature management system comprising a dual cold control configuration in accordance with another aspect of the present disclosure.
Figure 3B:
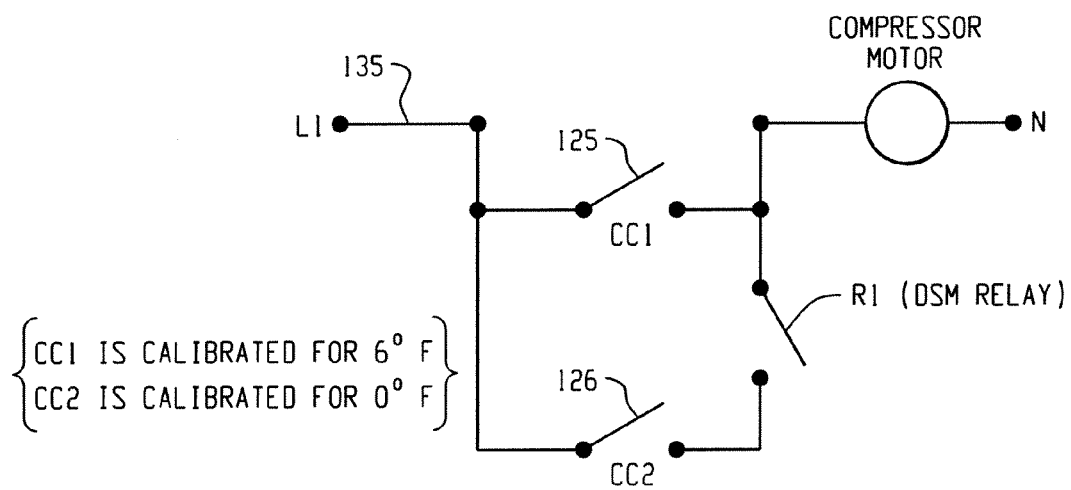

The system described herein adapts the above-described cold control for use with a DSM control module of an energy management system. With reference to FIG. 3(*a*), an illustrative embodiment is provided that includes two cold control devices, cc1 and cc2, supported on a common mounting plate 130, each with a separate bourdon tube 122(*a*), (*b*) and separate switches 125 and 126, each having a control knob shaft 132(*a*) and 132(*b*) respectively for manually adjusting the set point for its associated switch. The shafts 132(*a*) and 132(*b*) of the two switches 125 and 126 are mechanically linked by belt 134 for rotation together. Shaft 132(*b*) has attached thereto a user adjustable knob (not shown). By this arrangement, user rotation of the knob rotates both shafts concurrently thereby adjusting the setpoint of each control by the same amount. That is, user rotation of the control knob changes the setpoint of each control by the same number of degrees relative to their respective calibration setpoint temperatures. While the linkage illustrated in FIG. 3(*a*) is a belt, it is to be understood that any mechanical linkage operative to cause rotation together could be similarly employed, such as for example a gear train.

The bourdon tubes 122(*a*) (*b*) are attached to cold controls cc1 and cc2 such that they run parallel to each other with each tube located in the same compartment and are sensing the same temperature. The first cold control cc1 is calibrated to provide a first specific calibration temperature set point, as the midpoint setting for the control shaft. The second cold control cc2 is calibrated to provide a second calibration temperature set point different from the first at the midpoint setting for its control shaft. In the illustrative embodiment, the first calibration set point temperature is set at 0° F., and the second calibration setpoint temperature is set to a higher temperature of 6° F. As illustrated schematically in FIG. 3(*b*) the cold control switches 125 and 126 are electrically connected in parallel. The parallel combination is connected in series with the compressor. A DSM controlled switching device R1, is provided in series with the cold control switch having the lower calibration set point, which in the illustrative embodiment is switch 126, to selectively shift the lower set point control (cc2) in and out of the circuit. When the lower calibration set point control is in the circuit, even though both controls are operatively connected, the lower calibration setpoint control will always be controlling because the lower setpoint will always be exceeded first. When the lower setpoint control is shifted out of the circuit, operation of the compressor will be controlled by the higher calibration setpoint control. By this arrangement, opening the DSM controlled switching device R1, for example in response to a peak demand signal from a utility, increases the effective setpoint temperature for the compartment by the delta in calibration setpoints. In the illustrative embodiment this delta is chosen to be 6 degrees F. However other values could be similarly employed depending on the desired reduction in energy usage when operating the refrigerator in an energy saving mode. The DSM controlled switching device R1 is opened and closed in response to a signal from an associated DSM module, which receives a demand signal from an associated utility. When the signal indicates a peak demand period, the switch is opened, enabling control of the compressor by the second cold control and raises the selected set point temperature by 6° F. In contrast, when the signal indicates a non-peak demand period, the DSM controlled switching device R1 is closed, thus maintaining control by the first cold control. In the illustrative embodiment, the DSM controlled switching device R1 is an electromechanical relay device, preferably a single pole, single throw relay device. However, electronic switching devices could be similarly employed.

When the DSM module indicates a period of peak demand, the binary output of the DSM module will drive the DSM controlled switching device R1 to open, causing the system to enter energy savings mode and allowing only cc1 to control. Since cc1 has mid set point of 6° F., the refrigerator will now cycle around the 6° F. set point+/−hysteresis. At the conclusion of the peak demand period, R1 is driven to close and the system returns to normal mode, wherein the cc2 commands control, returning the refrigerator set point to 0° F.+/−hysteresis. There will be a limit on how warm a user can calibrate cc1, and there will be a max temperature the user is allowed to dial in. Therefore, the warmest possible setting of the cold control available to the user will need to coincide with this maximum allowable setpoint for food preservation criterion. This ensures that a compartment does not get too warm during a peak demand period and ruin any contents therein.

Although the system described herein is discussed mainly in terms of controlling the temperature in a refrigerator freezer, the system may alternatively or simultaneously be implemented into the fresh food compartment of a refrigerator and other refrigerated devices controlled by electromechanical cold controls described herein, for example a wine chiller, with set point temperatures adjusted within the limits of the acceptable performance limits of the said device. In the refrigerator example, the fresh food and freezer systems may be independent from each other or interrelated, such that shifting the freezer temperature set point also shifts the temperature set point in the fresh food compartment by a comparable degree.

Figure 4:
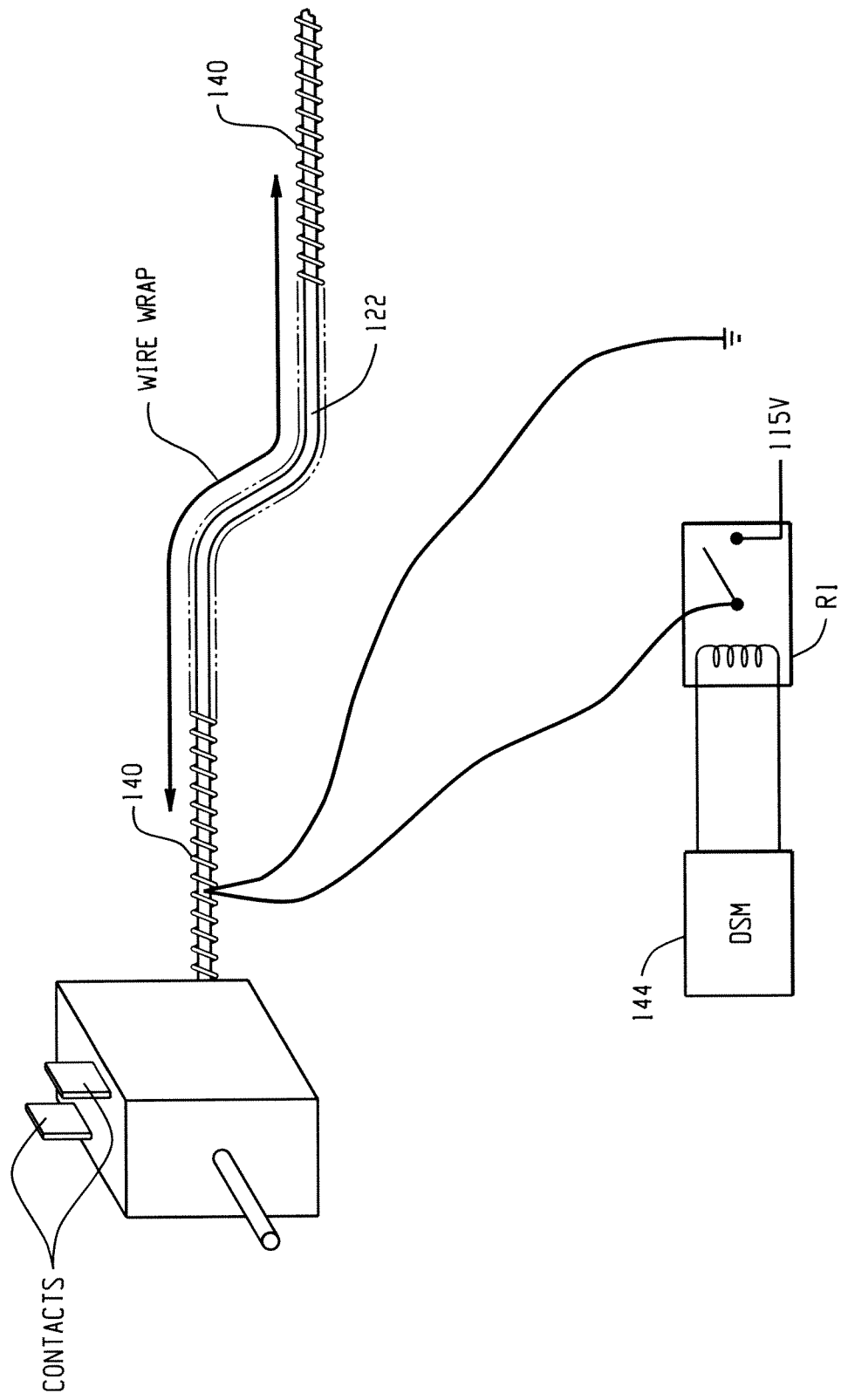
FIG. 4 illustrates a refrigerator temperature management system comprising a heated bourdon tube in accordance with another aspect of the present disclosure.

In an alternative embodiment, the same dual tier selectable temperature control concept is achieved, however with only one cold control device, rather than two separate cold control devices, as provided above. As best seen in FIG. 4, a heating element 140 is applied to the bourdon tube 122 to add a metered amount of heat to the tube to mimic a higher temperature. The heating element 140 may consist of an insulated nickel chrome wire heater that is coiled around the bourdon tube. A DSM switching device R1, similar to that provided above is employed and is controlled by a DSM module 144 to enable or disable the heating element 140. As with the scenario above, the cold control 120 is calibrated to a desired set point temperature with heat present from the heating element 140. The wattage of the heater is selected to effectively offset the control calibrated set point by a predetermined amount.

In one illustrative example, an insulated nickel chrome wire is coiled around a bourdon tube 122, which is connected to a single pole, single throw relay R1. The relay R1 is generally closed to enable the heater to deliver a very low calibrated wattage of heat to the bourdon tube 122. During a peak demand response, binary output from the DSM module 144 opens the DSM switching device R1 de-energizing the heating element 140. Without the heat from the heating element, the cold control 120 responds to the actual temperature in the compartment rather than a temperature that is offset by the heater, which has the effect of increasing the effective setpoint temperature by an amount determined by the wattage of the heater. In the illustrative embodiment, the wattage of the heater is selected to provide the desired effective increase of 6 degrees F, which is achieved with a minimal wattage heater. This wattage will be dependent on the design of the cold control, specifically the nature of the inert gas as well as the stiffness of the diaphragm spring. Therefore, the refrigerator's compressor and fans will be controlled to a setpoint temperature, which is 6 degrees higher than the user selected setpoint, until the peak demand period is over and the DSM module 144 closes the switching device and enables the heater once again, restoring the selected setpoint temperature as the effective setpoint temperature.

According to another aspect of the present disclosure, the heating means for the bourdon tube 122 is provided by a heat pipe 150 that extends from within the fresh food section (temperature of between approximately 37-44° F.) to add heat to the bourdon tube 122 that is exposed to freezer airflow, cycling at approximately 0° F. The heat pipe 150 acts as a conductive pipe that resides in the fresh food compartment. Since the fresh food compartment is typically at least about 37° F. and always significantly warmer than the Freezer, the pipe 150 will naturally conduct heat into the bourdon tube 122. If the heat pipe 150 is thermally connected to the bourdon tube 122 at all times, the offset is present continuously.

Figure 5:
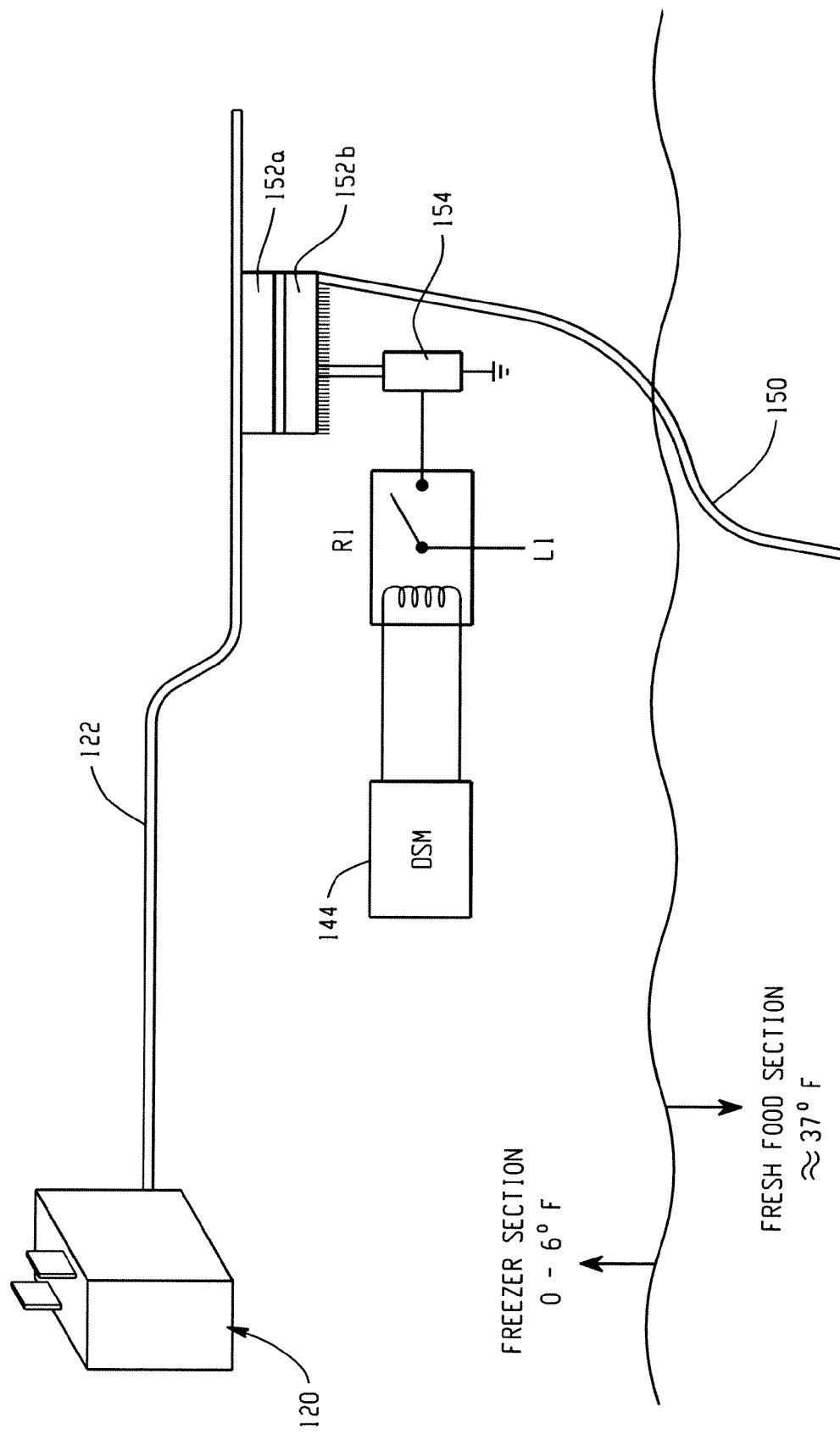
FIG. 5 illustrates a refrigerator temperature management system comprising a heated bourdon tube in accordance with yet another aspect of the present disclosure.

As best illustrated in FIG. 5, a moveable heat block 152 is provided and attached to the bourdon tube. The heat block includes an upper portion 152(a) and lower portion 152(b), with the lower portion 152(b) in contact with the heat pipe 150 and insulated from the freezer air, and the upper portion 152(a) is soldered to the bourdon tube 122. The lower portion 152(b) is moveable, such that it may be shifted to meet the upper portion heat pipe 150 to engage and disengage the heat flow along the heat pipe 150. As hereinbefore described with respect to the heater, the cold control 120 is calibrated with the heat block 152 engaging the heat pipe 150, such that the heat pipe is conducting heat into the bourdon tube 122 to deliver heat at a predetermined wattage level from the heat pipe 150. A DSM switching device R1 is driven by a DSM module 144, such that output from the DSM module 144 can cause the switching device R1 to energize or de-energize an associated solenoid 154. When energized, the solenoid 154 shifts the lower heat block portion 152(b) closer to the upper heat block portion 152(a) to enable heat flow along the heat pipe 150, through the heat blocks and to the bourdon tube 122. Other arrangements for shifting the conductive block may also be provided, such as a stepper motor, or the like. During a peak demand period, the switching device R1 opens to de-energize the solenoid 154 and cause the lower moveable heat block portion 152(b) to move away from the upper portion 152(a) and cut off the heat flow to the bourdon tube 122. Without the heat from the heat pipe, the cold control 120 responds to the actual temperature in the compartment rather than a temperature that is offset by the heat from the heat pipe, which has the effect of increasing the setpoint temperature by an amount determined by the amount of heat provided by the heat pipe when not disengaged. At the conclusion of the peak demand period, the DSM switching device R1 will close energizing the solenoid 154, which moves the lower heat block portion 152(b) back to engage the upper heat block portion 152(a) to return heat flow to the bourdon tube 122 restoring the effective setpoint for the control to the selected setpoint.

According to another embodiment of the present disclosure, a means of achieving a dual tier selectable set point may include equipping a cold control device 120 with multiple spring tension positions. Referring back to FIG. 2, a cold control comprises housing and a metal snap at the bottom where the bourdon tube comes in. The end of the bourdon tube that meets the cold control housing includes an elastomeric diaphragm 160, which is intimately associated with a counter spring 162 that is mounted to the housing. The spring includes two ends, one that is mounted against the housing and one that rests against the diaphragm 160. This counter spring 162 delivers a constant spring force against the diaphragm 160 to counter the back pressure on the opposite side of the diaphragm 160 emanating from the bourdon tube 122. The spring tension determines the cold control's temperature set point.

Figure 6:
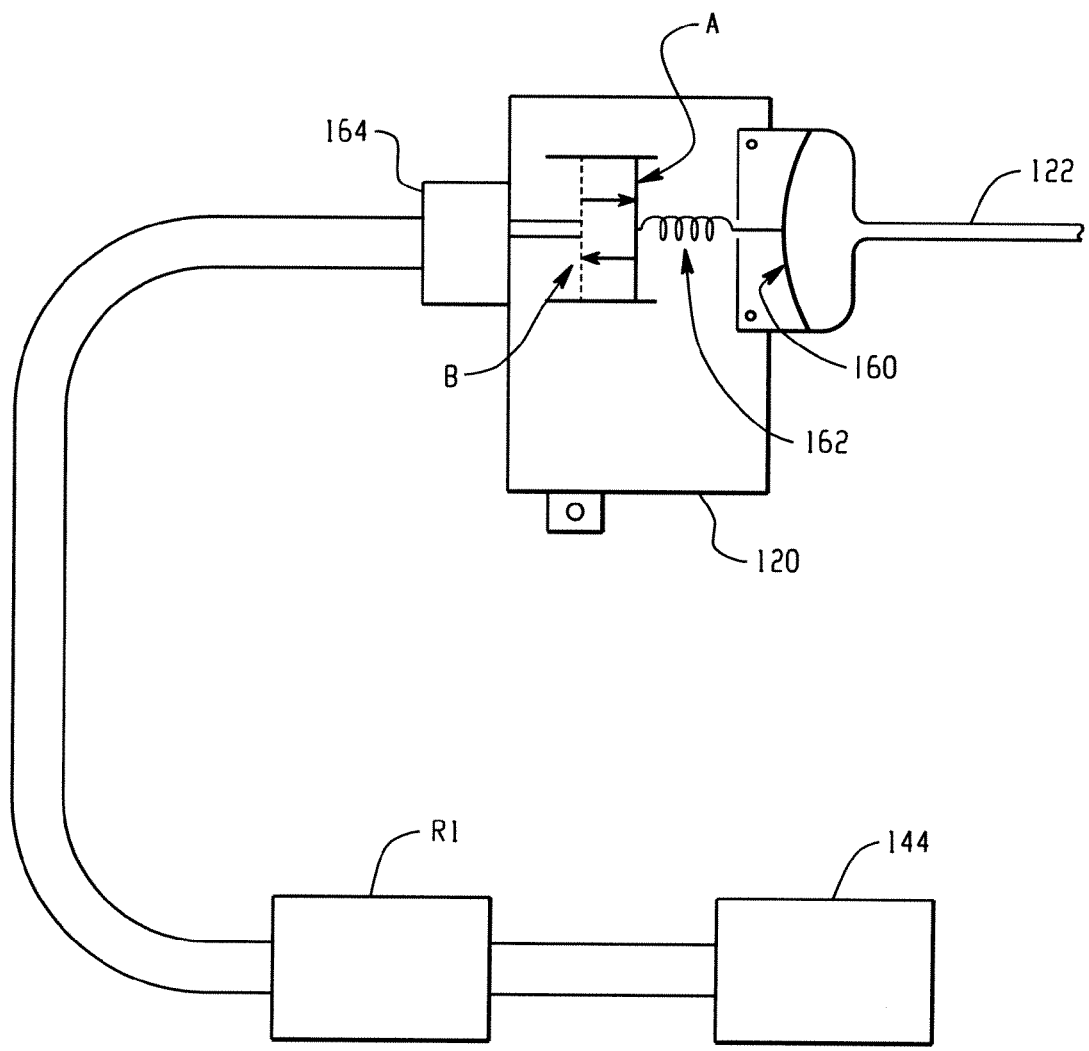
FIG. 6 illustrates a refrigerator temperature management system comprising a multiple tension counter spring in accordance with yet another aspect of the present disclosure.

As best illustrated in FIG. 6, the cold control 120 includes internal modifications, such that the counter spring 162 may provide varied levels of back pressure (force) against the gas pressure of the bourdon tube 122 and effectively shift the calibration point of the cold control 120 on demand. The levels can be achieved by several means, such as electromagnetic shifting of the spring base, a platen, or any other means of physically shifting the spring base upon command to deliver a new spring position resulting in a different force to counter the bourdon tube internal pressure. For instance, in terms of a platen, an actuator 164 may be included to shift the platen on the back side of the counter spring 162 from position A to position B, which changes the spring force, thereby changing the control set point from 0° F. to 6° F. Alternatively, the platen may shift the spring numerous times to a variable number of positions representing a variable array of temperature setpoint shifts. For instance, position C could represent 0° F., position B could represent 3° F., and position A could represent 6° F. Accordingly, one could choose to what degree the mechanical cold control was to shift its temperature set point, such as in the case of a medium demand period, cold control could only shift to about 3° F., rather than to about 6° F. In the case of multiple setpoints or positions, some means of multiple indexing beyond two positions would be required to position the platen at any one of the available positions. This could be achieved with numerous mechanical systems known to those skilled in the art. One example includes a stepper motor driven by multiple relays or by rotary cams that would shift the platen based on a variable voltage input to a stepper motor. The stepper could be indexed each time the relay pulses a voltage input to the motor. Various cam, motor, and linkage combinations known to those skilled in the art could be employed. Ultimately, the movement of the platen is controlled by the DSM switching device R1, implemented in a similar manner as described above. The DSM switching device R1 is controlled by the DSM module to engage or disengage the drive mechanism for the platen (or other spring shifting means). This shifting may be manually disabled by a user when higher set points are undesirable.

Figure 7A:
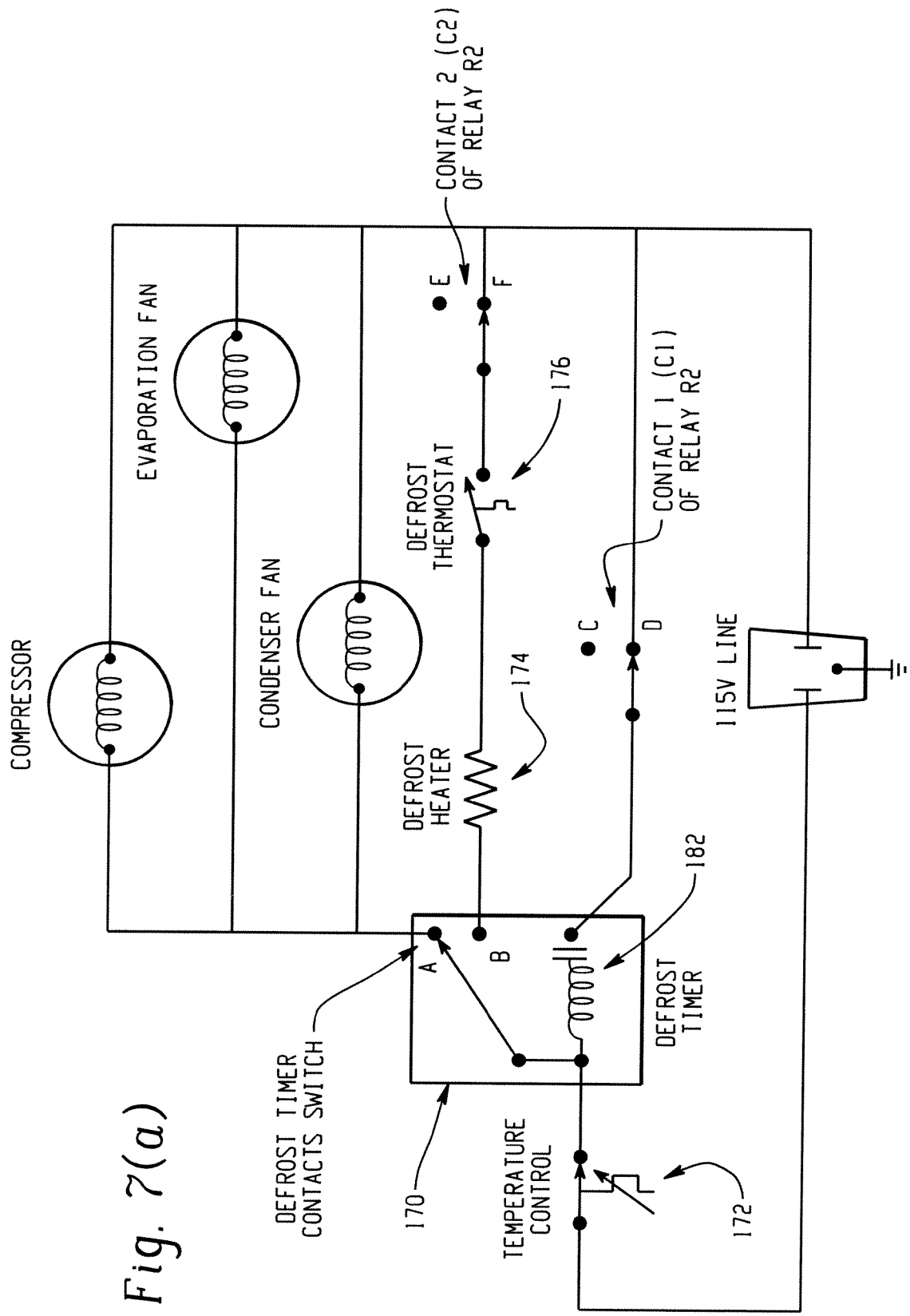
FIG. 7(*a*) illustrates a wiring diagram of a standard defrost circuit for electromechanical control in accordance with yet another aspect of the present disclosure.

In addition to adjusting the temperature set point of a refrigerator compartment, another circuit described herein and exemplarily illustrated in FIG. 7(a), may be used to disable or suspend the defrost cycle of a refrigerator during a peak demand period. In a non-DSM enabled electromechanically controlled refrigerator, an automatic defrost cycle is typically performed when the cumulative compressor run time reaches a predetermined total run time for example sixteen hours, which is established by the design of the defrost timer 170. This can be achieved using a timer actuated defrost heater control that controls the time between defrost cycles, the interval time, and the duration of the defrost cycle, the defrost time. Timer 170 is configured to turn on the defrost heater 174 when the interval timer times out. When the cold control 172 is satisfied or turns the system off, the timer motor 182 stops. By this arrangement, the defrost timer motor 182 initiates a defrost cycle every time the interval timer times out, such as in the above example, every sixteen hours of compressor run time. When it is time for defrost, the timer switch engages contact B, which enables energization of defrost heater 174 and switches the cold control 172 out of the circuit, thereby preventing it from having any control function relative to the cooling system or fans. The cooling system and fans will be disabled as long as contact B is engaged. Contact B will remain engaged until the defrost timer times out. In the illustrative embodiment, the defrost heater "on-time" is on the order of 20 minutes When the defrost duration timer times out, contact A will close, triggering the refrigeration system and fans to restart and return the system control to the cold control 172. The defrost interval timer will begin counting down until the next defrost period.

The timer motor 182, which advances the timer, runs only when the refrigerator cold control 172 is energized and calling for cooling from the refrigerator compressor. The defrost cycle is terminated in this non-DSM refrigerator when the defrost timer advances beyond the design defrost time or the defrost termination thermostat 176 opens due to a specified temperature being reached in the evaporator.

Figure 7B:
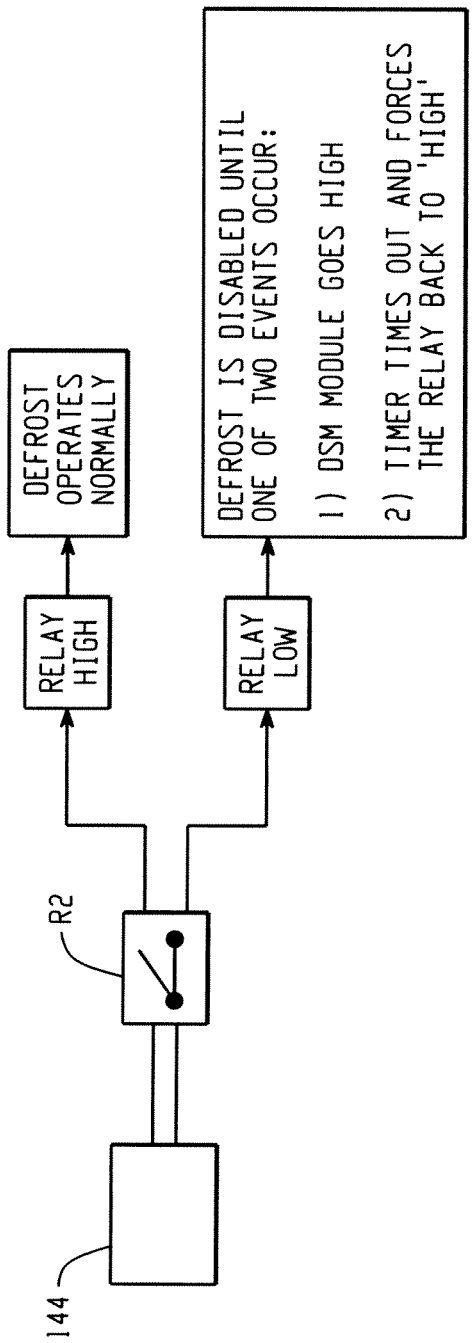

In the case of the DSM enabled electromechanical refrigerator and with reference to FIG. 7(b), a DSM controlled defrost switch is provided that comprises in the illustrative embodiment, a time delay latching relay R2 with two sets of contacts C1 and C2 that are serially placed in the voltage supply circuit of the defrost timer motor and the defrost heater respectively (FIG. 7(a)). According to this embodiment, R2 is preferably a single throw double pole relay which toggles between a first state in which contacts C1 and C2 are closed, and a second state in which contacts C1 and C2 are open. This relay incorporates a time delay feature which limits the total length of time the relay will remain "latched" in the second state. Once this delay time elapses, the relay will return to the first state. When the relay is in the first state with both sets of contacts closed in positions D and F (FIG. 7(a)), the defrost cycle operates normally. When the relay is switched to its second state with both sets of contacts open in positions C and E (FIG. 7(a)), the defrost cycle is disabled until at least one of two events occur: 1) the relay time delay latching relay R2 is switched to its first state by the DSM Module toggling the input because a peak demand period has concluded, or 2) the time delay latching relay R2 "times out" and switches the relay to its first state. Those skilled in the art of time delay latching relays will appreciate the circuitry inherent to a relay system that latches and starts a timer and remains latched until the relay "times out" or the input to the relay is toggled.

Without a time delay feature added to the relay, the DSM module would disable a defrost by way of contacts C1 and C2 for the entire length of time that the utility allotted for the demand response event. The defrost cycle would be disengaged until the utility pricing returned to a low cost state. While such suspension provides desirable energy reduction, suspension of defrost for a prolonged period may result in an undesirable build up of frost on the evaporator. To avoid such an occurrence, in the embodiment of the energy saving defrost control system of FIG. 7(a), the time delay relay R2 limits the length of time the defrost cycle can be delayed to the duration of the time delay period of the relay. A typical time delay period would be about four hours, since most utilities invoke demand response high or critical events for a 4 hour maximum elapsed time. Obviously, this timeout period could be set to any desired timeframe as controlled by the time delay built in to the timer. If set too long, the refrigerator would be at risk for over-icing of the evaporator in areas with high humidity and numerous door openings.

The DSM module is configured to switch relay R2 to its second state on receipt of a signal indicating the beginning of a peak demand state or high rate period, and to return the relay to its first state on receipt of a signal signifying the return to an off peak state of the end of the high rate period. For example, when a DSM high price event occurs, the DSM module 144 drives the time delay latching relay R2 to open contacts C1 & C2. By so doing, the defrost timer motor 182 is halted such that a defrost cannot be initiated in the future until the DSM module returns the relay to its first state, which occurs either at the end of the DSM event or the time delay inherent to the time delay latching relay is satisfied. Also, if a defrost is already underway when the DSM event occurs, the opening of contact C2 will terminate the defrost until the event is over or until the time delay latching relay timer "times out" and returns the system back to normal, i.e., unlatches the relay.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A system for reducing peak power consumption by a refrigeration system, comprising;
   a first electromechanical cold control calibrated to a first temperature setpoint;
   a second electromechanical cold control calibrated to a second temperature setpoint, said first and second cold controls each comprising a setpoint selector member, said setpoint selector members being operatively linked such that adjustment of one results in a corresponding adjustment of the other;
   a demand side management (DSM) module responsive to demand state signals from an associated utility indicative of at least a peak demand and an off peak demand state; and
   a DSM switching device responsive to said DSM module and operative to selectively render one or the other of said cold controls effectively operative to control a cooling system depending upon the demand state signals.

2. The system according to claim 1, wherein said first cold control is calibrated to a temperature setpoint of about 0° F.

3. The system according to claim 1, wherein said second cold control is calibrated to a temperature setpoint higher than the setpoint of the first cold control.

4. The system according to claim 3, wherein the DSM module causes the switching device to render said second cold control operative in response to a peak demand state signal, and the cooling system is controlled to a higher setpoint in response to the peak demand state signal.

5. The system according to claim 4, wherein after a designated period of time, the DSM module causes the switching device to render said first cold control operative regardless of the demand state signals.

6. The system according to claim 1, wherein the system controls the temperature in at least one of a freezer component and a fresh food compartment of the refrigeration system.

7. The system according to claim 1, wherein said DSM switching device is an electromechanical single pole, single throw relay device.

8. A method for reducing peak power consumption in an electromechanically controlled refrigerator comprising at least one compartment, said method comprising:
   mechanically linking a first cold control comprising a first adjustable switch to a second cold control comprising a second adjustable switch;
   calibrating the first cold control to a first temperature setpoint and the second cold control to a second temperature setpoint, wherein said second temperature setpoint is higher than said first temperature setpoint; and
   opening and closing a demand side management (DSM) switching device in response to a signal received from an associated DSM module indicative of at least a peak demand state and an off peak demand state of an associated utility, wherein opening said DSM switching device shifts control from said first cold control to said second cold control, causing the temperature to be controlled to a higher setpoint temperature.

9. The method according to claim 8, further comprising opening said DSM switching device in response to receiving a signal indicative of the peak demand state.

10. The method according to claim 9, further comprising controlling the temperature by the second cold control when said DSM switching device is open.

11. The method according to claim 8, further comprising closing the DSM switching device during the off-peak demand state, wherein the temperature is controlled by the first cold control.

12. The method according to claim 8, further comprising calibrating said first cold control to about 0° F. and calibrating said second cold control to a temperature setpoint higher than the setpoint of the first cold control.

\* \* \* \* \*